US006735500B2

United States Patent
Nicholas et al.

(10) Patent No.: US 6,735,500 B2
(45) Date of Patent: May 11, 2004

(54) METHOD, SYSTEM, AND COMPUTER PROGRAM PRODUCT FOR TACTILE CUEING FLIGHT CONTROL

(75) Inventors: Jeffrey S. Nicholas, Brookhaven, PA (US); David G. Miller, Mt. Laurel, NJ (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/430,543

(22) Filed: May 6, 2003

(65) Prior Publication Data

US 2004/0010354 A1 Jan. 15, 2004

Related U.S. Application Data

(60) Provisional application No. 60/387,501, filed on Jun. 10, 2002.

(51) Int. Cl.[7] ................................................ G06F 7/00
(52) U.S. Cl. ................................ 701/3; 701/1; 701/13; 244/17.13; 244/75 R
(58) Field of Search ........................... 701/1, 3, 13, 14; 244/17.13, 75 R, 158 R, 184

(56) References Cited

U.S. PATENT DOCUMENTS

| 5,403,155 A | 4/1995 | Head et al. |
| 5,499,785 A | 3/1996 | Roberts et al. |

OTHER PUBLICATIONS

Schaeffer et al. (US 2003/0094539 disclose a power lever tactile cueing system.*
Miller, Einthoven, Morse & Wood, "HACT Flight Control System (HFCS) Control Law Overview", Presented at the American Helicopter Society 58th Annual Forum, Montreal, Quebec, Canada, Jun. 11–13, 2002.
Nicholas, Clark, Ward, Jeram, & Prasad, "Development of Artificial Neural Networks for the HACT Flight Control System", Presented at the American Helicopter Society 58th Annual Forum, Montreal, Canada, Jun. 11–13, 2002.
Jeram, "Open Design For Helicopter Active Control Systems", Paper written for the Georgia Institute of Technology, School of Aerospace Engineering, Atlanta, GA.
Horn, Calise, Prasad & O'Rourke, "Flight Envelope Cueing on a Tilt–Rotor Aircraft Using Neural Network Limit Prediction", Presented at the American Helicopter Society 54th Annual Forum, Washington, DC, May 20–22, 1998.
Einthoven, Miller, Nicholas & Margetich, "Tactile Cueing Experiments with a Three Axis Sidestick", Presented at the American Helicopter Society 57th Annual Forum, Washington, DC, May 9–11, 2001.
Calise, Kim, Kam and Azam, "Neural Networks for Feedback Linearization in Aircraft Control",.
Ward, "Generalized Networks for Complex Function Modeling", Presented at the 1994 IEEE Systems, Man, & Cybernetics (SMC–94) Conference, Oct. 2–5, 1994; San Antonio, Texas.

* cited by examiner

Primary Examiner—Gertrude A. Jeanglaude
(74) Attorney, Agent, or Firm—Alston & Bird LLP

(57) ABSTRACT

A system, a method, and a computer program product for determining tactile cueing of a flight control input apparatus includes an interface for receiving observed parameters relating to the flight envelope of an aircraft. Upstream processing elements receive the observed states, convert dimensional aircraft state parameters into nondimensional aircraft state parameters, and provide the data to neural networks. The neural networks receive combinations of observed parameters and nondimensional aircraft state parameters and predict flight envelope limiting parameters. The neural networks are trained to predict the limiting parameters. A downstream processing element determines the most limiting flight envelope limiting parameter provided from the neural networks, therefore providing a tactile cueing position for a flight control input apparatus.

30 Claims, 9 Drawing Sheets

METHOD, SYSTEM, AND COMPUTER PROGRAM PRODUCT FOR TACTILE CUEING FLIGHT CONTROL

CROSS-REFERENCE TO RELATED APPLICATIONS

This application claims the benefit of U.S. Provisional Application No. 60/387,501, filed Jun. 10, 2002, which is hereby incorporated by reference.

FEDERALLY SPONSORED RESEARCH OR DEVELOPMENT

This invention was made with government support under United States government contract DAAH10-00-C-0052 awarded by the United States Army Aviation Applied Technology Directorate. The government may have certain rights in this invention.

FIELD OF THE INVENTION

This invention relates to tactile cueing flight control systems, and, more particularly, to flight control systems incorporating a plurality of neural networks to predict the most limiting flight envelope parameters and provide tactile cueing to a pilot.

BACKGROUND OF THE INVENTION

Aircraft warning systems generally require some form of state prediction. The states of an aircraft will vary greatly depending, however, upon the type and model of the aircraft. For example, the states of a rotorcraft may include torque parameters, thrust parameters, turbine temperatures, etc. Typically, the estimates of the states of an aircraft are derived from measurements provided by various sensors and knowledge of the dynamics of the aircraft.

One application of aircraft warning systems is to identify state limits such that the aircraft remains within a desired flight envelope. In this regard, tactile cueing systems have been used to avoid state limits in selected aircraft, but with limited applicability. Some cueing systems cue only with respect to avoidance of a single limiting factor or for only single maneuvers. While one state may be a limiting factor for many flight operations, other states may be more limiting in particular maneuvers. Single factor cueing systems, therefore, are not readily applicable to all aircraft maneuvers. Furthermore, some cueing systems depend only upon current aircraft states without respect to future estimated states. Without the lead time, provided by consideration of future estimated states these systems often fail to adequately ensure avoidance of operating limits.

Therefore, there is a need in the art to achieve sufficient accuracy in predicting aircraft states in dynamic maneuvers with enough lead time to provide the pilot with an effective tactile cueing system. In particular, a tactile cueing system should be robust enough to predict aircraft states and provide limit avoidance cues for maneuvers throughout different flight regimes.

SUMMARY OF THE INVENTION

A flight control system, a method, and a computer program product for determining tactile cueing of a flight control input apparatus are provided. Generally, pluralities of neural networks provide predicted and expected performance results of an aircraft in real time. These predictions and expected performance results are compared to the limits of the flight operating envelope for a particular aircraft. The most limiting of these parameters is identified and a corresponding position of the flight control input apparatus may be determined in order to provide a "stop" position to prevent the pilot from exceeding the flight envelope. In this regard, stop positions may be "softstops", wherein further flight control movement is impeded, but not prevented, in order to provide the pilot with a cue that the flight envelope may be exceeded with further movement. Alternatively, a "stop" position may also comprise a hardstop, beyond which no further movement is permitted.

Neural networks are particularly advantageous to use when implementing a tactile cue to a flight control input apparatus because they can perform the sophisticated, nonlinear, multivariable, real-time calculations required to generate smooth and effective tactile cues within the processing constraints of current generation on-board flight control computers. It has been found that neural networks predict aircraft performance more accurately than alternative techniques, such as using simplified "classical" rotor performance equations, and are possible to implement in an on-board flight control computer. Neural networks are especially effective for envelope limit protection by tactile cueing because they do not exhibit the gross inaccuracies that are characteristic of classical equations during edge-of-the-envelope operation. In fact, neural network predicted state information supplemented by sensor measurements allows envelope limit encroachment to be predicted with adequate lead time to allow either the pilot or flight control system to act to prevent or mitigate the consequences of limit impingement.

To this end, a system, a method and a computer program product for determining tactile cueing of a flight control input apparatus are described herein. The system includes an interface for receiving observed parameters relating to the flight envelope of an aircraft. These observed parameters relate to an aircraft state and other states requiring limit avoidance. Upstream processing elements receive the observed states for filtering and provide the data to predictive neural networks. Several of the upstream processing elements convert dimensional aircraft state parameters into nondimensional aircraft state parameters. The predictive neural networks receive combinations of observed parameters and nondimensional rotor state parameters and predict flight envelope limiting parameters based thereupon. The neural networks are advantageous in this regard as they are generally capable of being trained to predict the limiting output based on a set of training data. A downstream processing element determines the most limiting flight envelope limiting parameter provided from the neural networks. In determining the most limiting parameter, a tactile cueing position is then provided for a flight control input apparatus, thereby providing limit avoidance.

BRIEF DESCRIPTION OF THE SEVERAL VIEWS OF THE DRAWINGS

Figure 1:
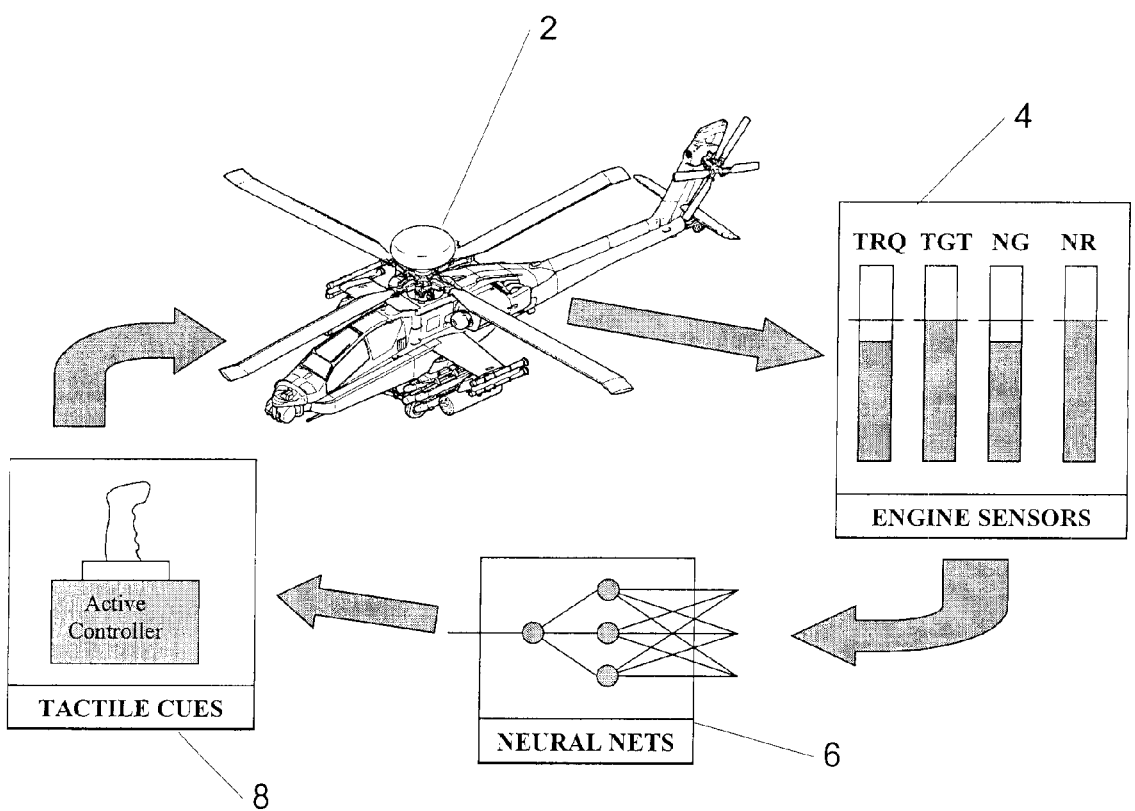
Figure 2:
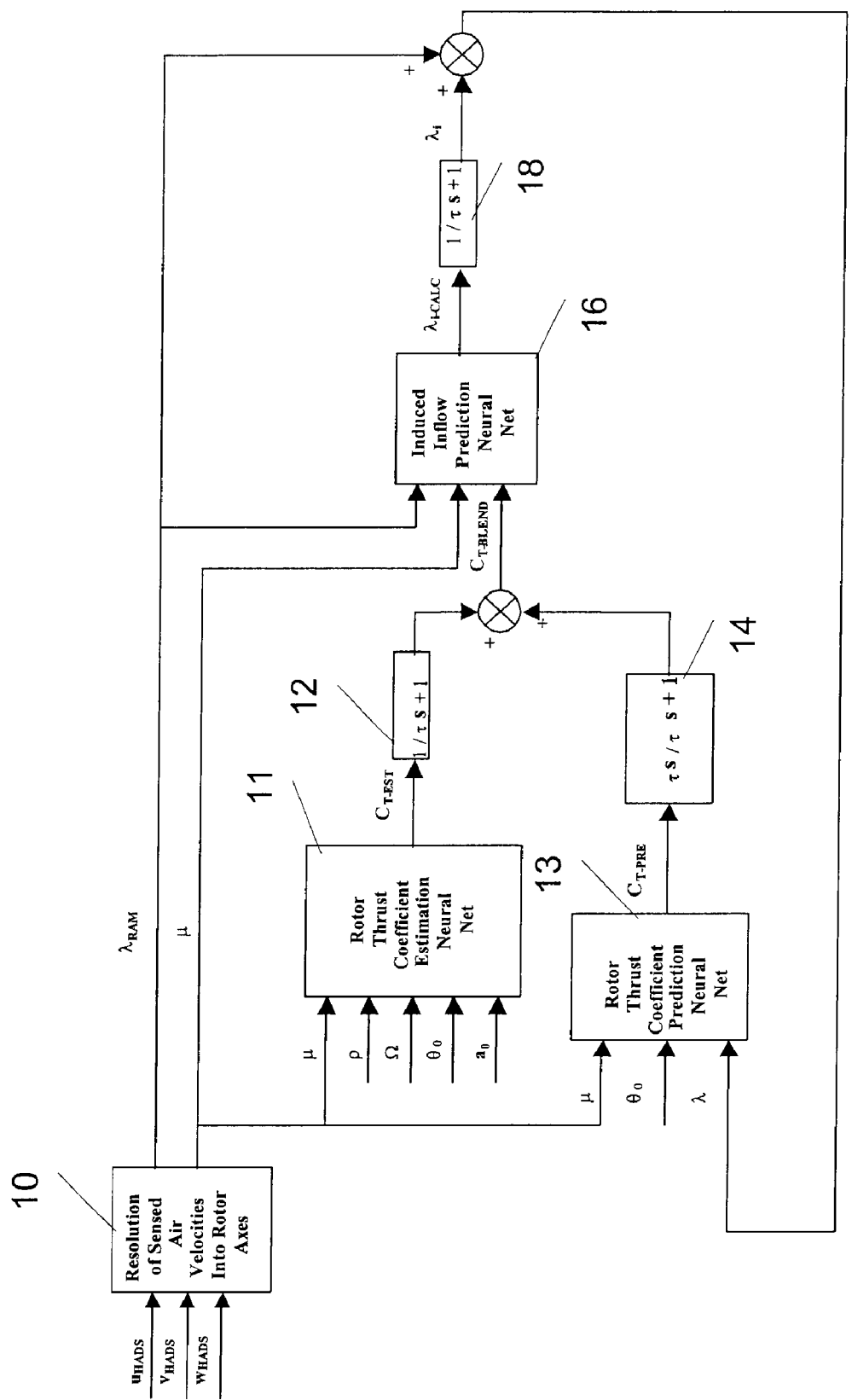
Figure 3:
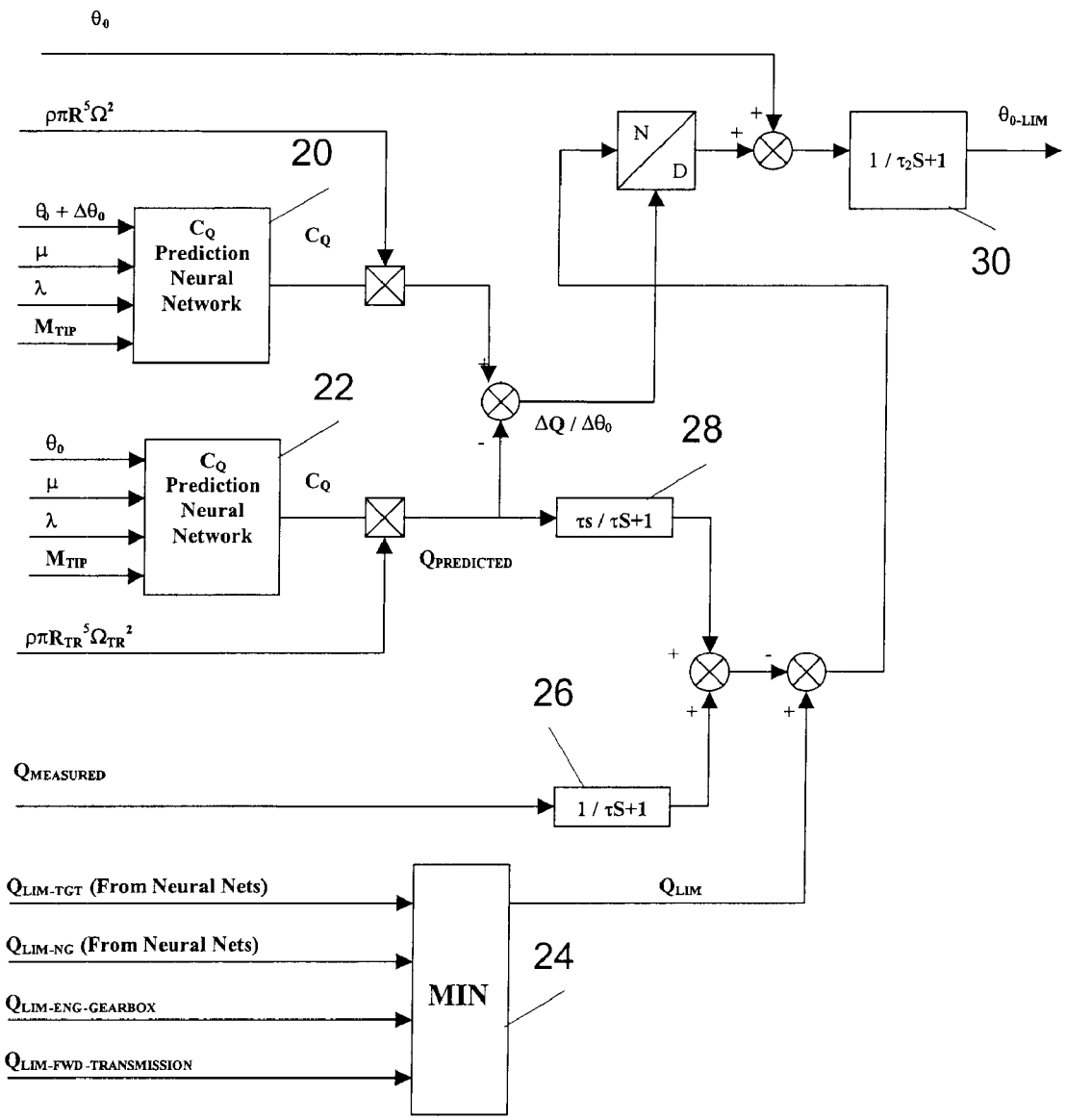
Figure 4:
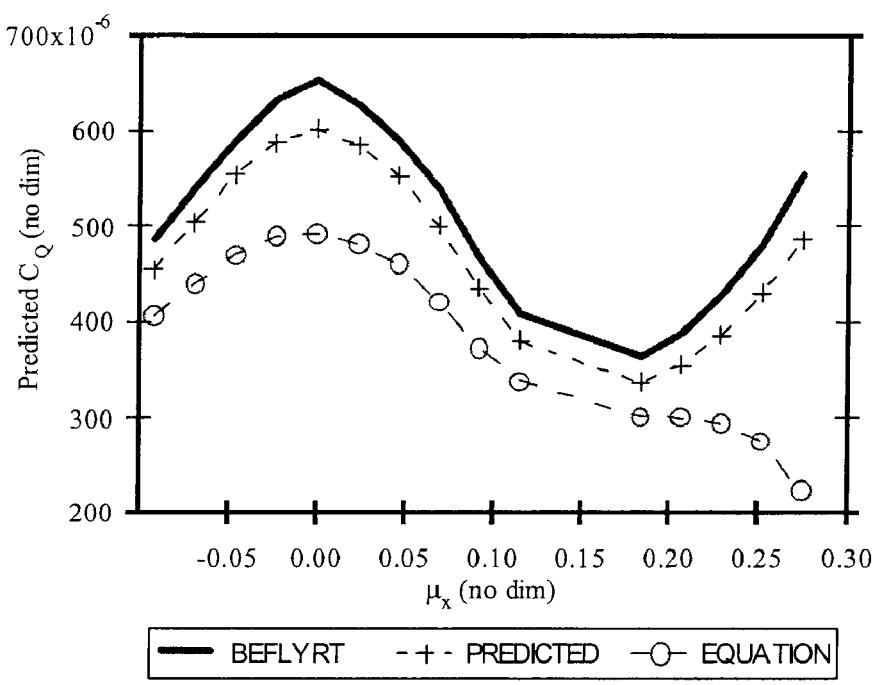
Figure 5:
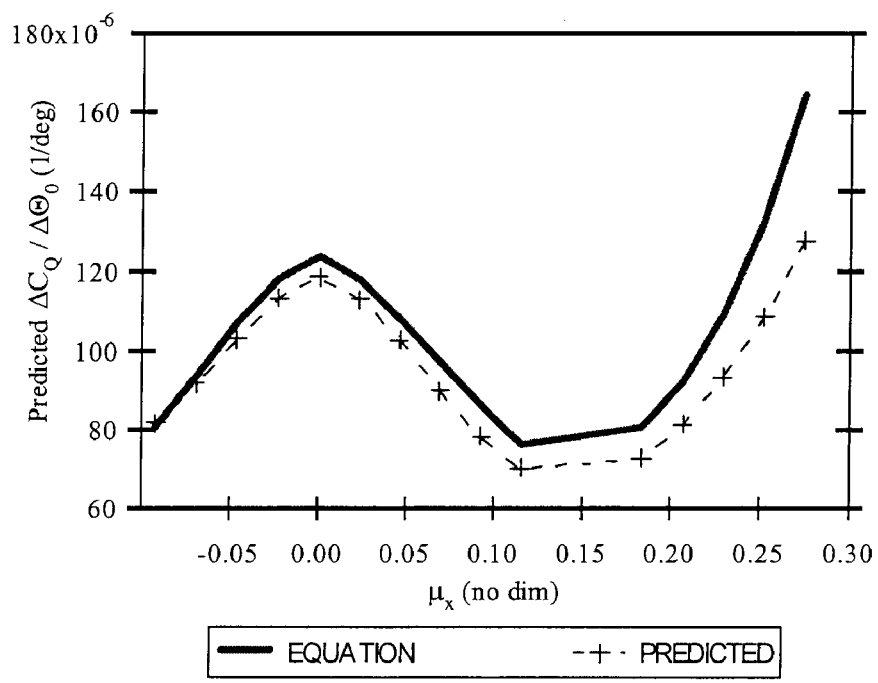
Figure 6:
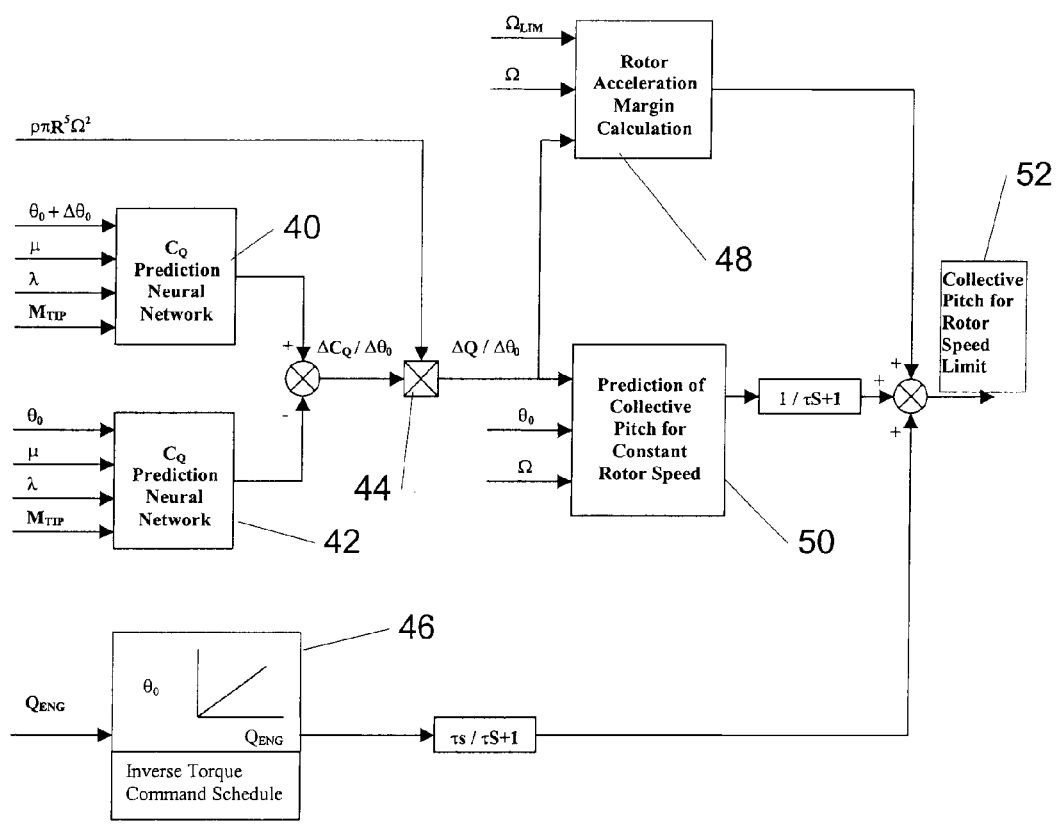
Figure 7:
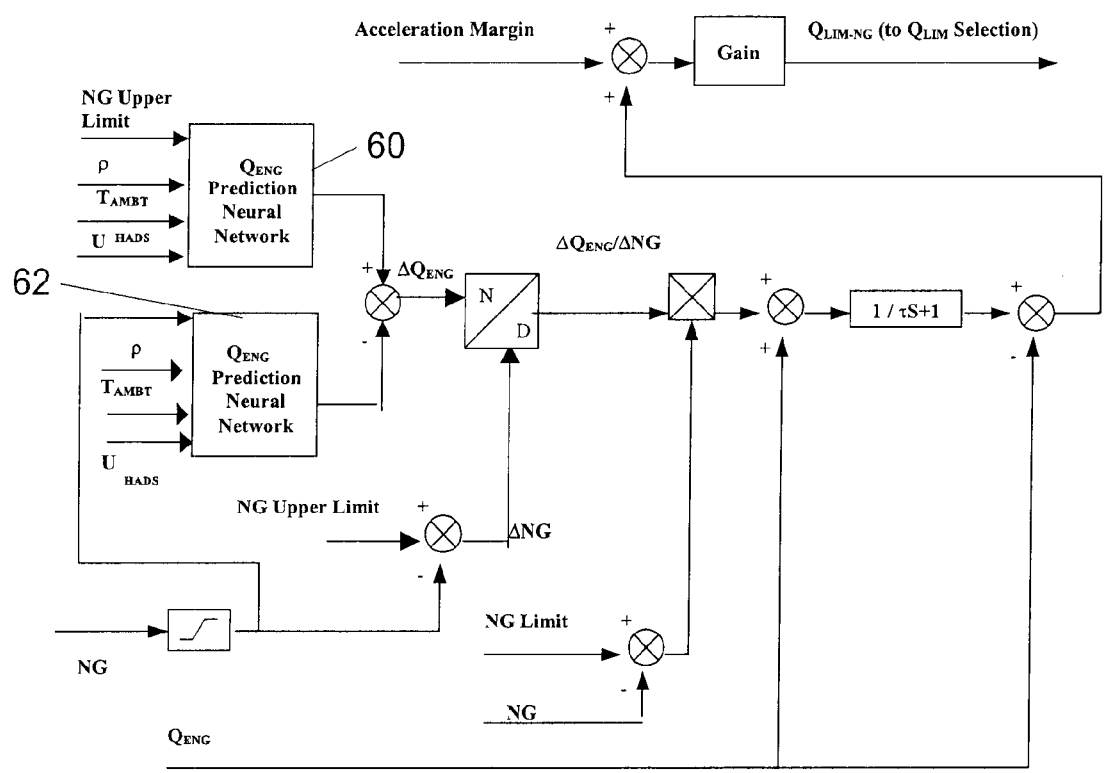
Figure 8:
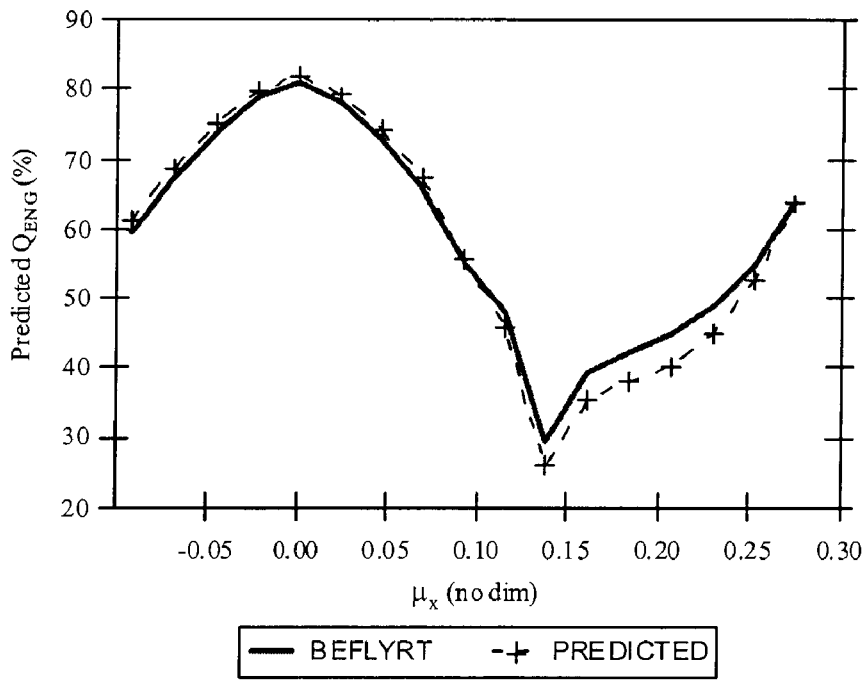
Figure 9:
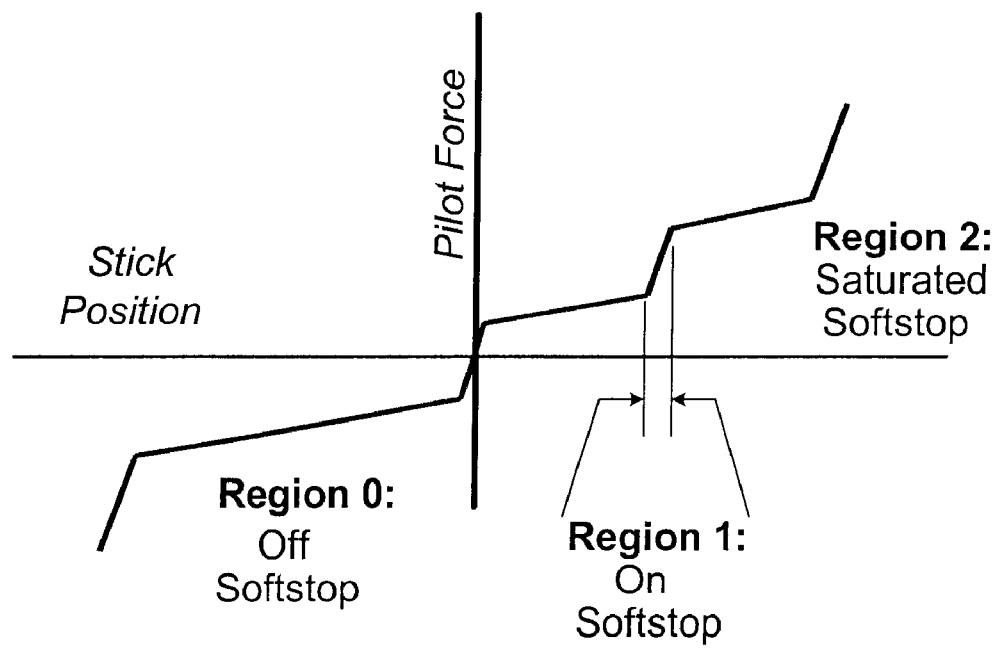
Figure 10:
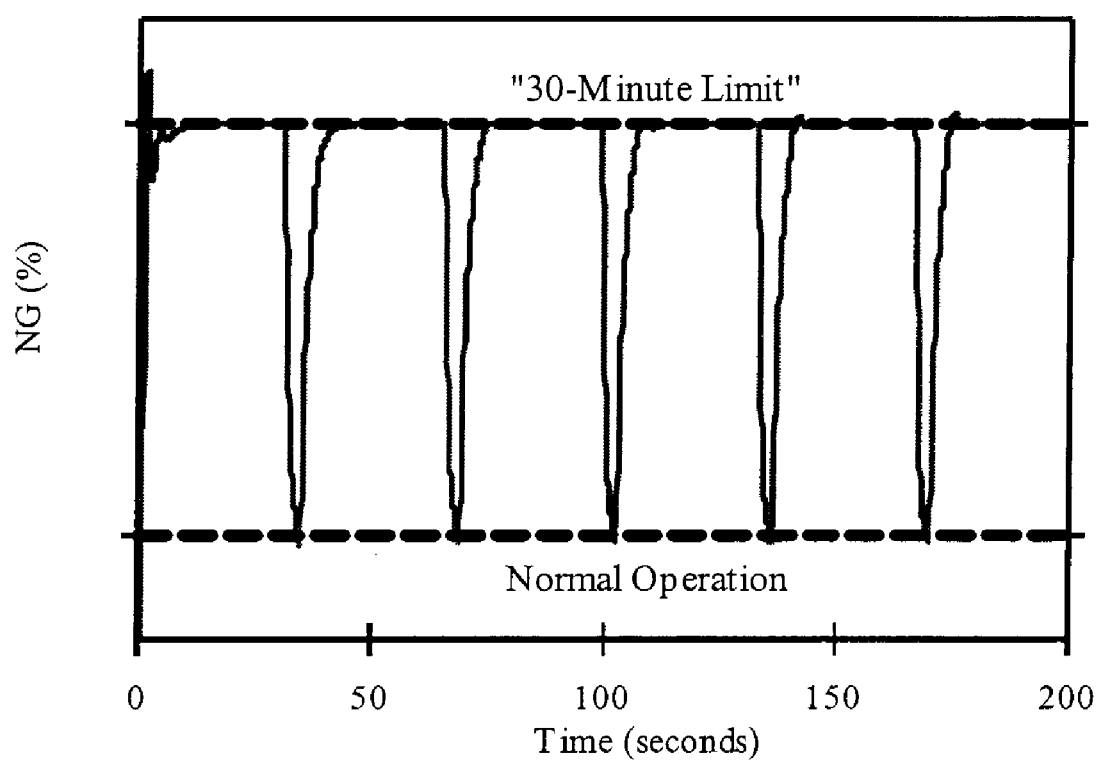
Figure 11A:
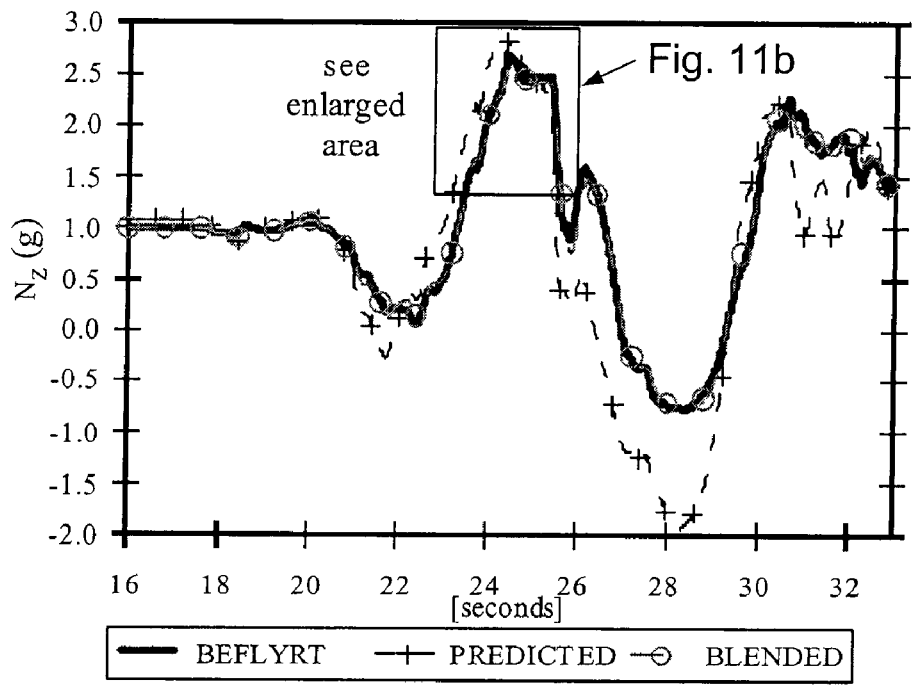
Figure 11B:
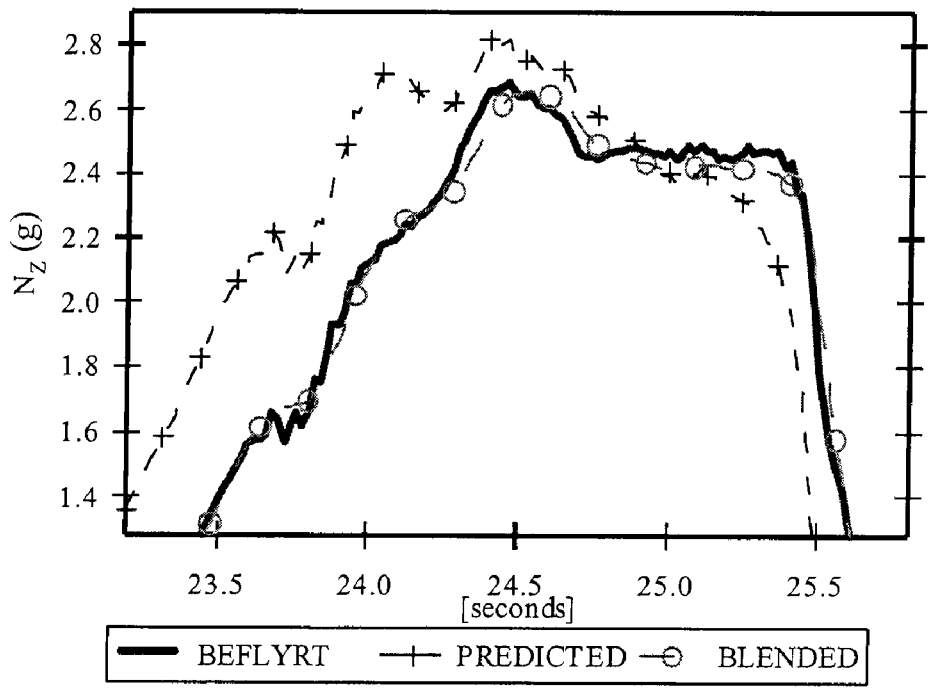

Having thus described the invention in general terms, reference will now be made to the accompanying drawings, which are not necessarily drawn to scale, and wherein:

FIG. 1 is a block diagram of flight control operations and tasks according to one embodiment of the present invention;

FIG. 2 is a block diagram of a neural network system that predicts rotor thrust and downwash for use in a flight control system, method and computer program product according to one embodiment of a present invention;

FIG. 3 is a block diagram of a neural network system for transmission and engine performance limit management for use in a flight control system, method and computer program product according to one embodiment of the present invention;

FIGS. 4 and 5 are graph illustrations comparing classical rotor equations to neural network predictions in a flight control system, method and computer program product according to one embodiment of the present invention;

FIG. 6 is a block diagram of a rotor overspeed and underspeed limiting algorithm for use in a flight control system, method and computer program product according to one embodiment of the present invention;

FIG. 7 is a block diagram of an engine gas generator speed limiting algorithm for use in a flight control system, method and computer program product according to one embodiment of the present invention;

FIG. 8 is a graph illustration comparing neural network system performance to classical rotor equations in a flight control system, method and computer program product according to one embodiment of the present invention;

FIG. 9 illustrates softstop modeling for a pilot control stick for use in a flight control system, method and computer program product according to one embodiment of the present invention;

FIG. 10 illustrates engine gas generator speed limiting by a neural network system for use in a flight control system, method and computer program product according to one embodiment of the present invention; and FIGS. 11(a)–(b) are graph illustrations of the ability of neural networks in a flight control system, method and computer program product to predict vertical load factor.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

For purposes of discussion, the present invention of a flight control system, a method, and a computer program product for determining tactile cueing of a flight control input apparatus are described in conjunction with the AH-64D helicopter and an associated flight control system. However, the flight control system, method and computer program product may be employed in conjunction with a wide variety of aircraft, including, for example, both airplanes and rotorcraft. By way of explanation, however, one embodiment of the invention is described with respect to the U.S. Army Helicopter Active Control Technology program (HACT), which designs, develops, and evaluates a full authority HACT Flight Control System (HFCS).

FIG. 1 illustrates the functional relationship of neural networks 6 in a flight control system of a rotorcraft. Neural networks 6 generally predict limiting aircraft states based on sensors 4 from the engine, rotor, and other general aircraft state sensors. Neural networks 6 may be designed to follow various control laws and, with respect to an AH-64D helicopter may advantageously follow flight control laws with Regime Recognition, Carefree Maneuvering, and Task Tailored Control Law systems.

Carefree Maneuvering integration into a flight control system allows full use of the flight envelope while permitting heads up operation of the flight controls by a pilot. Pilot "heads up" operation improves helicopter control, particularly during Nap Of Earth (NOE) flight regimes where the pilot's eyesight is depended upon to detect and avoid obstacles. Task Tailored Control Laws denote automatic tailoring of the flight control laws, control response type, inceptor force characteristics, and cockpit displays to improve mission effectiveness. Regime Recognition is the process of inferring mission profile, flight task, aircraft state, and pilot intent for the purpose of configuring the flight control system. As known to those skilled in the art, neural networks are an advanced predictive technique used in the flight control system to recognize flight regimes and identify impending regime transitions with sufficient lead-time for control law tailoring and carefree maneuvering.

Depending upon the type and model of the aircraft, the aircraft may have various flight control input apparatus to provide pilot input to the flight control system. With continued reference to FIG. 1, in a modified AH-64D helicopter 2 incorporating the present invention, both pilot and co-pilot employ an active 3-axis right hand sidestick controller 8 (commonly referred to as the cyclic, however, the 3-axis controller also incorporates yaw control commonly operated by foot pedals) and an active left-hand vertical controller (commonly referred to as the collective). Tactile cues, in the form of softstops on the pilot sticks or other flight control input apparatus, physically caution the pilot against making potentially damaging control inputs, but may be overridden by the pilot (by pushing through the softstops) during emergency situations, when additional performance requirements justify the added airframe structural risk. These stops may be implemented through electrical, mechanical, hydraulic, or pneumatic actuators to provide the necessary force-feel characteristics for a particular flight control input apparatus. These actuators are known to those of ordinary skill in the art and, as such, may advantageously be implemented in conjunction with the invention described herein.

The following discussion, therefore, describes exemplary embodiments for determining the cueing positions for the flight control input apparatus based on the Operational Flight Envelope (OFE), typically defined in advance based upon the type and model of aircraft to insure continued safe flight. Before proceeding, however, it is appropriate to define the abbreviations and descriptors used herein, at Table 1.

TABLE 1

Common Notations

| | |
|---|---|
| $A_1$ | Lateral Cyclic Pitch |
| $B_1$ | Longitudinal Cyclic Pitch |
| $C_T$ | Rotor Thrust Coefficient |
| $C_Q$ | Rotor Torque Coefficient |
| GW | Aircraft Gross Weight |
| HDOT | Rate of Climb/Descent |
| $M_{TIP}$ | Rotor Tip Mach Number |
| NG | Gas Generator Speed |
| $N_Z$ | Vertical Load Factor |
| P | Roll Rate |
| $P_{PRIME}$ | Nondimensional Rotor Hub Roll Rate |
| Q | Pitch Rate |
| $Q_{PRIME}$ | Nondimensional Rotor Hub Pitch Rate |
| $Q_{ENG}$ | Engine Transmission Torque |
| $Q_{MAST}$ | Main Rotor Shaft Torque |
| R | Yaw Rate |
| $T_{AMBT}$ | Ambient Temperature |
| TGT | Turbine Gas Temperature |
| U | Body-Axis Forward Speed |
| V | Body-Axis Sideward Speed |

TABLE 1-continued

Common Notations

| | |
|---|---|
| W | Body-Axis Vertical Speed |
| XCG | Fore/Aft (Longitudinal) Center of Gravity |
| YCG | Lateral Center of Gravity |
| ZCG | Vertical Center of Gravity |
| $a_0$ | Coning Angle |
| $a_1$ | Longitudinal Flapping Angle |
| $b_1$ | Lateral Flapping Angle |
| $\delta_B$ | Longitudinal Controller Position |
| $\delta_C$ | Vertical Controller Position |
| $\gamma$ | Locke Number |
| $\lambda_I$ | Induced Inflow Ratio |
| $\lambda_{TOT}$ | Total Inflow Ratio |
| $\lambda_{RAM}$ | Relative Air Mass (RAM) component of Inflow Ratio |
| $\mu_{TOT}$ | Total Advance Ratio |
| $\mu_X$ | Longitudinal Advance Ratio |
| $\mu_Y$ | Lateral Advance Ratio |
| $\theta_0$ | Collective Pitch |
| $\theta$ | Pitch Attitude |
| $\phi$ | Roll Attitude |
| $\rho$ | Air Density |
| $\Omega$ | Rotor Rotational Speed |
| $Q_{T\_NG}$ | Steady-State Engine Torque as a Function of Gas Generator Speed |
| $Q_{T\_TGT}$ | Steady-State Engine Torque as a Function of Engine Temperature |
| $\partial C_T/\partial \theta_0$ | Partial Derivative of Thrust Coefficient with Respect to Collective Pitch |
| $\partial C_Q/\partial \theta_0$ | Partial Derivative of Torque Coefficient with Respect to Collective Pitch |
| $\partial a_1/\partial B_1$ | Partial Derivative of Longitudinal Flapping with Respect to Longitudinal Cyclic Pitch |
| $\partial b_1/\partial A_1$ | Partial Derivative of Lateral Flapping with Respect to Lateral Cyclic Pitch |

Flight control system neural networks may be configured in various manners including software embodiments comprising reusable macros. The inputs to the neural networks are provided via one or more interfaces that receive various observed parameters relating to aircraft states. The parameters received by the interface may also be processed by upstream processing elements, such as a suitable program and flight control computer. By selecting different sets of inputs or modifying the filtering on the inputs to the networks, the neural networks are configured to simultaneously support multiple applications in the control system. Most of the flight control system neural networks described herein predict fundamental, nondimensionalized aircraft state parameters, such as $C_T$, for which ranges of possible values and fundamental sensitivity trends are well understood by those of ordinary skill in the art. As described below, the output of the neural networks may be further processed, such as by one or more downstream processing elements, also generally provided by a suitably programmed flight control computer, to determine the tactile cueing that is to be provided via the flight control input apparatus.

Referring now to FIG. 2, input parameters to flight control system neural networks utilized to predict rotor thrust and inflow for flight control operations are generally normalized aircraft state parameters, such as rotor inflow ($\lambda$) and advance ratios ($\mu$) that collapse many aircraft state characteristics into a much smaller subset of fundamental aircraft state parameters. Comprehensive aircraft state measurement, including omni-directional/low airspeed sensing and aircraft state measurement, and advanced digital processing capabilities permit the flight control system to calculate these fundamental aircraft state parameters in real time.

An interface to the flight control system is provided to receive and process input parameters, such as omni-directional and low airspeed data from the AH-64D Helicopter Air Data System (HADS) and advanced rotor state information such as blade flap and lag angle positions. Each main rotor blade's flap and lag angles are sensed and communicated by the interface to the flight control system at low latency and high bandwidth. Upstream processing elements (block 10) resolve omni-directional airspeed data (body-axis forward, sideward, and vertical speed) into the rotor control axes and nondimensionalize the data with respect to tip speed to calculate advance ratio ($\mu$) and the Relative Air Mass (RAM) component of inflow ratio ($\lambda_{RAM}$). With respect to the exemplary embodiment of FIG. 2, the resolution processor 10 is an upstream processing element and prepares the inputs for use by the neural networks 11, 13. Rotor thrust coefficient estimation processor 13 is both a neural network and an upstream processing element that prepares nondimensional parameters for other neural networks. Similarly, processing elements, such as filters 12, 14, are considered downstream processing elements and implement control algorithms utilizing the predicted and estimated parameters provided by the neural networks. In this embodiment, rotor thrust coefficient ($C_{T\text{-}BLEND}$) is calculated from complementary filters, 12, 14 that blend estimated rotor thrust ($C_{T\text{-}EST}$), based primarily on measured rotor coning, with predicted rotor thrust ($C_{T\text{-}PRE}$), based primarily on commanded collective pitch and predicted control axis inflow ratio. $C_{T\text{-}EST}$ is accurate at low frequencies, where flapping sensor noise and higher harmonic flapping contributions are attenuated and Locke Number flapping dynamic effects can be neglected. The low frequency rotor thrust estimate is obtained through calculation of the rotor blade centripetal moment required to balance the moment due to rotor thrust.

The availability of flapping sensors allows accurate low frequency estimation of rotor out-of-plane centripetal moments. If flapping is not an available sensor measurement, the low frequency portion of the complementary filter could be provided based on vertical load factor and gross weight. $C_{T\text{-}PRE}$ is less accurate in steady-state conditions but more accurate in predicting rapid thrust changes because it avoids the roughly 100 ms delay in coning response to thrust perturbations that occur as a result of flapping dynamic inertial relief and upper boost actuator dynamics.

The collective pitch-based prediction is obtained through direct calculation of rotor aerodynamic forces, providing a prediction of rotor thrust that leads the vertical forces applied to the airframe during rapid collective pitch inputs without amplifying high frequency noise. A neural network 16 is used to calculate the steady state induced inflow ratio ($\lambda_{i\text{-}CALC}$) that corresponds to $C_{T\text{-}BLEND}$, $\lambda_{RAM}$, and $\mu$ inputs. The predicted $\lambda_i$ neural network 16, therefore, eliminates the need to iteratively solve the nonlinear and implicitly coupled relationship between thrust and inflow, providing the induced velocity solution in an efficient and consistent single-pass process. The steady state $\lambda_{i\text{-}CALC}$ is then lagged (block 18) at the downstream processing element to account for air mass dynamics and to provide additional lead in calculations shown in FIG. 2 such as $C_{T\text{-}PRE}$ that depend upon $\lambda_{TOT}$, the total of $\lambda_{RAM}$ and induced inflow velocity ($\lambda_i$). Flight control system prediction of $\lambda_i$ allows prediction of other fundamental parameters that depend upon definition of the air velocities seen by the rotor, such as rotor torque.

In addition to that shown in FIG. 2, various other predicative neural networks can be designed and utilized, as will be apparent to those skilled in the art, to predict other parameters that may limit the flight control input apparatus.

By way of example, FIG. 3 describes a neural network for implementing the flight control system transmission and engine performance limit management carefree maneuvering algorithm. Neural networks 20, 22 are used to predict main rotor mast torque ($Q_{MAST}$) levels corresponding to input parameters relating to Gas Generator Speed (NG), Turbine Gas Temperature (TGT), Engine Transmission Torque ($Q_{ENG}$), and Main Rotor Shaft Torque Limits. The flight control system selects the most critical transmission torque and engine performance limits based on equivalent mast torque margins. Limit prediction horizons range from 2.5 seconds for turbine gas temperature limits to 0.3 seconds for gas generator speed limits, such as maximum continuous limits, 10 minute and 30 minute limits, and never-exceed limits. These limits are recognized and used to define operative "soft" and "hard" power limits, and thus can be weighted according to recognized regimes.

Among other things, the neural networks determine the flight envelope limiting parameters based upon the current and predicted states of the aircraft. The flight envelope limiting parameters are the values of the various flight parameters that will cause the aircraft to impinge upon the edge of the predefined flight envelope for the state of the aircraft, such as engine speed and torque, rotor torque, aircraft speed, etc. Based upon the flight envelope limiting parameters, the downstream processing elements determine the most limiting parameter. The downstream processing elements also determine the tactile cueing position for one or more flight control input apparatus based on the most limiting parameter or parameters to alert the pilot of potential impingement upon the edge of the flight envelope and, in the case of a hardstop, to prevent the pilot from impinging thereupon.

As an example, neural networks of FIG. 3 are used to predict main rotor $\theta_0$ settings corresponding to operative "soft" and "hard" power limits. The predicted "soft" $\theta_0$ limits are used to drive vertical controller ($\delta_C$) softstops. The predicted "hard" $\theta_0$ limits are used for transient limiting of $\theta_0$ actuator commands and to drive vertical controller stick shaking cues. Transient torque overshoot of soft limits within the 6 second transient limit is designed into the system to give full performance capability for near-earth operations. Limiting of $\theta_0$ actuator commands is disabled when the pilot pulls through $\delta_C$ softstops. Recognition of single engine operation is used to disable turbine gas temperature and gas generator speed limiting algorithms, allowing the pilot to fly to rotor speed droop limitations during operations with one engine inoperative.

FIG. 3 also illustrates how the flight control system uses neural networks for online partial derivative calculations that are used in many of the carefree maneuvering algorithms. Many flight control system predictive neural networks have been trained to provide accurate derivatives with respect to their primary inputs. For example, the Predicted $C_Q$ neural network 20, 22 has been trained to predict both $C_Q$ and the $\partial C_Q/\partial \theta_0$ derivative. This allows gradients that are useful in limit prediction algorithms to be calculated in a straightforward and efficient single-step process, as shown in FIG. 3, that accounts for all the secondary sensitivities that exist as a result of interdependencies among the other inputs to the neural network. Training the neural network to match the primary input control sensitivities guards against overfit and bounds the closed loop phase and gain characteristics of the neural network when used in closed loop control system applications.

FIG. 4 illustrates an example of how a trained neural network is a better predictor than a classical rotor aerodynamic equation. In FIG. 4 the AH-64D blade element rotor model (BEFLYRT) data represents the "truth model" for main rotor torque coefficient ($C_Q$). Both the neural network (labeled PREDICTED) and the classical rotor equation (labeled EQUATION) are expected to replicate the truth model (labeled BEFLYRT) torque coefficient trends with nondimensionalized airspeed. FIG. 4 shows that the neural network predictions match the truth model data better than the classical rotor equation, particularly at the upper end of the airspeed spectrum where the classical rotor equation predicts a torque versus airspeed trend that is completely opposite to the actual truth model trend. The neural network is a better predictor at high airspeeds because it accounts for the nonlinear and coupled effects of inflow, advance ratio, and collective pitch on rotor torque. In addition to predicting the future value of $C_Q$, the incremental change in torque with collective pitch ($\delta C_Q/\delta \theta_0$) is also used by the flight control system to regulate rotor torque for several carefree maneuvering and power management functions. FIG. 5 shows that the trained neural network (labeled PREDICTED) provides a $\delta C_Q/\delta \theta_0$ derivative that is similar in character and smoothness to that provided by the classical rotor equation (labeled EQUATION). Thus the neural network provides a torque/collective derivative that is as useful for control system applications avoiding the simplified "classical" assumptions.

Real time calculated derivatives such as the $\partial C_Q/\partial \theta_0$ derivative are used in many applications by the flight control system. Referring to FIG. 6, an illustration of rotor speed limiting carefree maneuvering algorithm, $\partial C_Q/\partial \theta_0$ is dimensionalized (blocks 40, 42, 44) to give the $dQ_{MAST}/d\theta_0$ terms in the equation below, which is used to predict collective pitch $\theta_{0-\Omega}$ corresponding to operation on rotor overspeed and underspeed limitations (block 52).

$$\theta_{0-\Omega} = \left[\frac{1}{\tau s + 1}\right]\left\{\theta_0 - I_0 \frac{d\Omega/dt}{dQ_{MAST}/d\theta_0}\right\} + \left[\frac{\tau s}{\tau s + 1}\right]\{\theta_0(Q_{ENG})\} + \left\{2c_1(\Omega_{LIM} - \Omega)\frac{I_0}{dQ_{MAST}/d\theta_0}\right\}^{\frac{1}{2}} \quad (1)$$

Equation (1) is best understood as a superposition of the $\theta_0$ position predicted for steady-state operation at constant rotor speed (block 50) and an acceleration margin term (block 48) that is proportional to the square root of the margin between the current rotor speed and the limit rotor speed. The first two terms in equation (1) represent a complementary filter that predicts the $\theta_0$ position required to maintain constant rotor speed (block 50). The low frequency portion of the complementary filter is derived from current $\theta_0$ position, rotor system polar inertia ($\rho \pi R^5 \Omega^2$), and the predicted change in rotor aerodynamic torque (block 40) with $\theta_0$ predicted by the flight control system main rotor $C_Q$ prediction neural networks. The high frequency portion of the complementary filter is derived from a prediction of the $\theta_0$ position required for constant rotor speed at the current level of $Q_{ENG}$ (block 46). The acceleration margin term (block 48) is the transient collective pitch margin that can be utilized without overshooting the limit rotor speed or exceeding reasonable rates of collective pitch displacement to accelerate or decelerate the rotor. The rotor acceleration margin term is calculated based upon optimal zero overshoot limiting of integrated response critical systems, for example, such as described in "Tactile Cueing Experiments with a 3-axis controller," Einthoven, et al. American Helicopter Society 57th Annual Forum, May 2001, incorporated herein by reference. Equation (1), therefore, can be used by downstream tactile cue generating processors to generate a smooth tactile cue for sustained operation on rotor speed limits during single engine and autorotative flight conditions. The high frequency portion of the filter also allows the prediction to adjust instantaneously to the $\theta_0$ required to maintain rotor speed following engine failures or in powered flight conditions where transient rotor droop occurs.

By way of another example, FIG. 7 illustrates the operation of the flight control system transmission and engine performance limiting algorithms for managing gas generator speed, NG. The output is provided to the torque limit section illustrated (block 24) in FIG. 3. Engine torque ($Q_{ENG}$) is predicted based on gas generator speed, ambient temperature, air density, and airspeed over a range of non-dimensional airspeeds ranging from rearward flight to high speed forward flight (blocks 60, 62). As illustrated in FIG. 8, neural network predictions (labeled "PREDICTED") agree with BEFLYRT simulation math model "truth" data (labeled "BEFLYRT"). As a result, the engine torque prediction neural network can be used to predict the engine torque setting and main rotor shaft torque value that will result in gas generator speed limit impingement. Once the operative gas generator speed limit is defined, and the rotor shaft torque for limit impingement is predicted, the torque limiting control laws described in FIG. 3 can be used by downstream tactile cue limiting processors to generate softstops that limit torque to values and maintain gas generator speed within acceptable limits. As such, the flight control system control laws recognize continuous and 30-minute operational regimes for gas generator speed and automatically drive the $\delta_C$ softstop when required to lower gas generator speed to within the 30-minute operating limit.

As illustrated in FIG. 9, the softstop is modeled as a stiff spring that saturates at a prescribed force level. When the pilot operates on the stiff spring portion of the softstop (region 1), increased damping is added to the system force feel response. When the pilot pushes through the softstop (region 2), the softstop acts only as a force bias, and no additional damping is added. The softstop saturation force (Softstop Limit), the softstop spring gradient (Softstop Spring) and the Softstop Damping Ratio are tuned for pilot manuevering. Pilots are generally insensitive to the exact value used for the spring gradient as long as it exceeds a minimum threshold of perceptibility. Pilots are most sensitive to the damping ratio felt when operating on the softstop spring (region 1). This is because high damping generates high forces when the softstop is first contacted, effectively slowing the stick down while providing the pilot with a crisp and unambiguous tactile cue. High damping ratios prevent the pilot from inadvertently pushing the stick through the softstop. Values used for the softstops in each axis are given in Table 2.

TABLE 2

Softstop Characteristics

| Axis | Softstop Limit | Softstop Spring | Damping Ratio |
|---|---|---|---|
| Pitch | 5 lbs. | 25 lbs./deg. | 1.5 |
| Roll | 5 lbs. | 25 lbs./deg. | 1.5 |
| Yaw | 5 in-lbs. | 25 in-lbs/deg. | 1.0 |
| Coll. | 7.5 lbs. | 50 lbs./in | 1.5 |

FIG. 10 shows that the control laws, incorporating neural network-predicted $Q_{ENG}$, constrain gas generator speed to its desired operational range in a maximum power climb. Note that FIG. 10 shows that the gas generator speed carefree maneuvering system automatically resets gas generator speed (NG) from the 30-minute (emergency operation) limit to just below the maximum continuous power (normal operation) limit. Once gas generator speed is slowed below the maximum continuous power limit, the 30-minute timer is reset and gas generator speed is allowed to operate at the 30-minute limit for another 30 minutes. In this way, the gas generator speed carefree maneuvering algorithm allows the engines to provide maximum climb performance without violating any limits and without requiring any pilot workload. It should be noted that the gas generator speed time limit was artificially reduced to 30 seconds, instead of the actual value of 30 minutes, in order to shorten the piloted simulation experiment that provides the data shown in FIG. 10.

The flight control system may also limit Vertical Load Factor ($N_z$). In the pitch rate command response type control laws, the shaped longitudinal stick position (cyclic, $\delta_B$) is proportional to vertical load factor during steady-state maneuvering. Accordingly, a softstop is located on cyclic, $\delta_B$, based on complementary filtered $N_z$, which is based on measured $N_z$ and on predicted $N_z$ generated by a neural network. The predicted $N_z$ neural network is important in the pullup and pushover type maneuvering used by helicopter pilots to avoid obstacles during terrain following flight. Typically, pilots need to push the longitudinal stick forward as peak load factor is approached to avoid excessive pitch attitudes that deplete the helicopter's kinetic energy and load factor generating capability. Pushing the stick forward at just the right moment and rate to avoid excessive speed loss while maintaining peak vertical load factor is often counterintuitive. However, the softstop provided by the $N_z$ neural network allows the pilot to simply pull the stick aft until the softstop is contacted and then "ride the limit", or allow the softstop to define the ideal $\delta_B$ position, to obtain optimal $N_z$ performance.

FIGS. 11a and 11b demonstrate the performance of the $N_z$ prediction neural network in a Pullup/Pushover maneuver. The $N_z$ predicted by the neural network (labeled PREDICTED) leads the truth model $N_z$ profile (labeled BEFLYRT) by roughly 0.25 seconds. This 0.25 seconds of lead-time allows the predicted $N_z$ to be smoothed prior to driving the softstop without introducing delays that would corrupt load factor limiting performance for rapid pilot inputs. The filtered $N_z$ signal, labeled "BLENDED" because a complementary filter is used to blend the predicted $N_z$ with highly filtered $N_z$ sensor measurements, providing a vertical load factor softstop that is both timely and comfortable for the pilot to "ride".

The foregoing has been exemplary of the implementation of the neural networks within a flight control system, and will be recognized by one of ordinary skill in the art as generally applicable to implementing neural networks within flight control systems. Therefore, the following more specifically identifies several advantageous neural networks for incorporation into a flight control system for the AH-64D, however, additional neural networks and control flow patterns will be recognized by one of ordinary skill in the art when applied to other aircraft and flight control platforms. As such, softstops determined by each predictive neural network are ultimately compared and the most limiting softstop is applied to an actuator to provide a tactile cue that prevents the safe flight envelope from being exceeded. Table 3 lists the neural networks used in the AH-64D Helicopter Active Control Technology (HACT) flight control system, along with the flight envelope limits and functions supported by the respective neural networks and the inputs for each neural network.

TABLE 3

Flight Control System Neural Networks

| Flight Control System Neural Network | Flight Envelope Limits and Functions Supported | Inputs |
|---|---|---|
| Predicted Main Rotor $C_Q$ | Transmission Torque Cueing/Limiting Rotor Speed Cueing/Limiting Engine Load Demand Anticipation | Commanded $\theta_0$; Predicted $\lambda_{TOT}$; $\mu_{TOT}$; $\rho$; $M_{TIP}$ |
| Predicted Main Rotor $C_T$ | Rotor Stall Detection Rotor Thrust Prediction | Commanded $\theta_0$; Predicted $\lambda_{TOT}$; $\mu_{TOT}$ |
| Estimated Main Rotor $C_T$ | Rotor Thrust Estimation Based on Measured Rotor Flapping Power Settling Avoidance | Measured $a_0$; Commanded $\theta_0$; Normalized $N_Z$; $\mu_{TOT}$; $\gamma$ |
| Predicted Main Rotor $\lambda_i$ | Rotor Stall Protection | Predicted $C_T$; Estimated $C_T$; $\lambda_{RAM}$; $\mu_{TOT}$ |
| Predicted $Q_{T\_NG}$ | NG Cueing/Limiting | NG; $\rho$; $T_{AMBT}$; U |
| Predicted $Q_{T\_TGT}$ | TGT Cueing/Limiting | TGT; $\rho$; $T_{AMBT}$; U |
| Auto-rotational Main Rotor $\theta_0$ | Automatic Autorotation Mode | Normalized GW; U; $\Omega$ |
| Main Rotor $a_0$ | Rotor Flapping Cueing/Limiting Inner-Loop Flapping Regulation | Predicted $C_T$; Commanded $\theta_0$; Commanded $B_1$; $\mu_X$; $\rho$; $Q_{PRIME}$; $P_{PRIME}$ |
| Main Rotor $a_1$ | Rotor Flapping Cueing/Limiting Inner-Loop Flapping Regulation | Commanded $\theta_0$; Commanded $B_1$; Commanded $A_1$; Predicted $\lambda_{TOT}$; $\mu_X$; $\rho$; $Q_{PRIME}$; $P_{PRIME}$ |
| Main Rotor $b_1$ | Rotor Flapping Cueing/Limiting Inner-Loop Flapping Regulation | Commanded $\theta_0$; Commanded $B_1$; Commanded $A_1$; Predicted $\lambda_{TOT}$; $\mu_X$; $\rho$; $Q_{PRIME}$; $P_{PRIME}$ |
| Tailrotor $C_T$ | Tailrotor Gearbox Cueing/Limiting Engine Load Demand Anticipation | Predicted $\lambda_{TOT}$; Commanded $\theta_0$; $\mu_{TOT}$ |
| Tailrotor $\lambda_i$ | Tailrotor Gearbox Cueing/Limiting Engine Load Demand Anticipation | Predicted $C_T$; $\mu_{TOT}$; $\lambda_{RAM}$ |
| Tailrotor $C_Q$ | Tailrotor Gearbox Cueing/Limiting Engine Load Demand Anticipation | Commanded $\theta_0$; Predicted $\lambda_{TOT}$; $\mu_{TOT}$ |
| Predicted $N_Z$ | Vertical Load Factor Cueing/Limiting | Commanded $\theta_0$; Commanded $B_1$; Commanded $A_1$; Measured $N_Z$; U; $\theta$; $\phi$; GW; $\rho$ |

Neural Network Development

From a coding perspective, each neural network may be integrated into the flight control system in a manner identical to lag nodes, integrators, transient-free switches, and other commonly used flight control system macros. In this regard, neural network macros may be validated as fundamental building blocks of the flight control system and then used in as many applications as necessary by connecting their inputs to different variables or to variables that are filtered in a slightly different manner. For example, a partial derivative with respect to an input of a neural network can be estimated on-line by using the neural network in a second instance in which the appropriate input is perturbed slightly, and then calculating the finite difference between the unperturbed and perturbed neural network outputs.

Most of the neural networks discussed in the embodiment of the present invention have been Polynomial Neural Networks (PNNs), consisting of algebraic sums of multinomial terms. However, the $N_Z$ prediction neural network has been implemented and tested in the simulator in both hyperbolic tangent and PNN forms to prove that the flight control system architecture is open to any type of neural network structure. The hyperbolic tangent neural net form consists of weighted sums of hyperbolic tangent, or sigmoidal, activation functions. Other neural networks are also easily adapted and accordingly substituted for the neural networks described herein, such as those described in D. G. Ward, "Generalized Networks for Complex Function Modeling", 1994 IEEE Systems, Man & Cybernetics (SMC-94) Conference, Oct. 2–5, 1994, San Antonio, Tex. and such as those described in A. J. Calise, B. S. Kim, M. Kam, and M. Azam, "Neural Networks for Feedback Linearization in Aircraft Control", AIAA Guidance, Navigation and Control Conference, Hilton Head, S.C., Aug. 10–12, 1992, incorporated herein by reference.

The fundamental flight control system architecture presented here for using a plurality of neural networks to receive combinations of observed parameters and nondimensional rotor state parameters and predict rotorcraft flight envelope limits in a manner suitable for tactile cueing is independent of the specific functional form of the neural networks used in the present embodiment of the invention. As a result, the invention described herein is postured to take advantage of the rapidly advancing state-of-the-art of using artificial neural networks to represent physical processes of all types.

One Approach to Generating Neural Network Training Data

The flight control system neural networks were created and integrated beginning with training data collection and neural network training. After neural network training, the trained networks were implemented first with a flight simulation laboratory, open loop tested, and then integrated with other aspects of the flight control system. After integration with the flight control system, the overall system was pilot tested in a flight simulator.

Training data were generated based on the parameters that need to be predicted via neural networks. Additionally, the type of data that will provide the most accurate predictions over the broadest possible envelope were determined.

Set-point condition data and expected functional relationships were used to create and train neural networks in the form of dynamic trim data obtained by sweeping through the range of influencing variables in the flight simulation laboratory. Non-dimensionalized aerodynamic parameters were used whenever possible in order to allow for the broadest possible aircraft state space coverage in dynamic trim data, to facilitate consistent neural network verification and integration with flight control system designs, and to create an approach which can be easily implemented on other aircraft.

Dimensionless parameterization also greatly reduced the required volume of training data. For example, main rotor $\mu_X$ is a function of U, V, W, P, Q, R, XCG, YCG, ZCG, and main rotor $\Omega$. In this instance, the full range of main rotor $\mu_X$ data was obtained by varying only one parameter (U). Had dimensional parameterization been used instead, state space coverage would have dictated varying each of the 10 inputs by itself and in combination with the other 9 inputs. By avoiding this "combinatorial expansion," dimensionless parameterization required about $10^{-10}$ (0.00000001%) of the data collection effort of filling dimensional state space—for just this one dimensionless parameter. It should be noted that dimensional data sweeps may be required to supplement the training data where specific, dimensional predictions are desired. For example, XCG- and YCG-driven data were required in order to obtain a full range of flapping data. In the HACT program, the training trim data test plan included varying 11 parameters, as listed in Table 4.

TABLE 4

Flight control system Neural Network Training Trim Data Test Plan

| Test Input | Range |
|---|---|
| Main Rotor $\theta_0$ | Full range for AH-64D |
| Main Rotor $\mu_X$ | −0.1 to +0.4 |
| Main Rotor $\mu_Y$ | −0.1 to +0.1 |
| Main Rotor $\lambda_{TOT}$ | −0.15 to +0.05 |
| Main Rotor $Q_{PRIME}$ | −0.05 to +0.05 |
| Main Rotor $P_{PRIME}$ | −0.05 to +0.05 |
| R | −90 to +90 deg/sec |
| Pressure Altitude | 60 to 10,000 ft |
| $\Omega$ | 94 to 107% |
| XCG | Full range for AH-64D |
| YCG | Full range for AH-64D |

Several of the neural networks were trained with dynamic trim data generated by a high fidelity simulation math model. Dynamic trim data are obtained by allowing the fast dynamics associated with rotor blade flap and lag motion and induced inflow to reach steady state (trim) over a range of rotor operating conditions that encompasses both accelerated and unaccelerated rigid body maneuver states. Dynamic trim data were selected over more voluminous time history data for the following reasons. Trim data will provide a broader range of accurate results within the desired tolerances. Trim data cover the entire linear range of the aircraft response and the near reaches of the nonlinear aircraft response. The steady-state values of the flight simulator aircraft response model are nearly identical to those of the real aircraft. Time-history simulation data, however, are by their nature not as accurate relative to the real aircraft. Trim data are also independent of control law design changes.

Trim data were also selected for collection efficiency. Trim data can be gathered very easily in batch simulations by an engineer from a desk while connected remotely to the flight simulation computer. Bad data points (untrimmed points, singularity points, etc.) can be easily weeded out using a spreadsheet by checking against defined limits. On the other hand, time-history data collection requires a well-scripted piloted simulation test card, flown real-time in the flight simulation laboratory, which is shared with other projects and thus subject to limited availability.

Trim data also permit training common data points for each individually trained neural network. The same trim data set can be used to train several different neural networks, meaning that data need only be gathered once. The use of time-history data can require vastly different flight maneuvers for different neural networks. For example, a series of roll reversals used to train for main rotor $b_1$ prediction would have minimal benefit to training for main rotor $a_1$ prediction.

Also trim data is the most accurate relative to the real aircraft and therefore the least affected by aircraft response model updates. Since updates always and more greatly affect time-history data, such time-history neural network-training data are potentially invalidated with each aircraft response model update.

Time-history simulation data would likely vary enough from aircraft data to require a full re-training of all neural networks at flight test. But simulation trim data should vary little from flight testing trim data. So, if required, flight testing time-history data can be used to supplement, rather than replace, the original training data from the flight simulator. By requiring far less flight testing data for re-training, this option potentially saves months of flight testing schedule versus using time-history simulation data.

The training of neural networks with simulation trim data does involve tradeoffs between trim data and time history data. For example, dynamic trim may not be possible in extreme portions of the flight envelope involving post-stall phenomena. However, training a neural network to replicate post-stall phenomena is limited because (1) the purpose of the neural networks is to provide tactile cues that prevent encountering stall, and (2) the neural network should cue the pilot to stall recovery procedures based on well understood pre-stall trends. For example, even though reducing collective pitch could increase rotor thrust in the post-stall regime, the flight control system would not depend upon this local post-stall gradient to recover from rotor stall into a dynamically unstable post-stall regime. Instead, the flight control system would utilize the pre-stall thrust/collective pitch gradient to cue the pilot to recover into the dynamically stable pre-stall flight regime. It is believed that the area of coverage is sufficient for tactile cue design and close enough for flight testing to require at most only modest supplementation by aircraft time-history data. Additionally in the flight control system of the present invention, constraining each neural network output to a reasonable range provides confidence in the neural network output during a flight condition outside the trim training data state space.

The dynamics of the physical system must be defined explicitly and understood with confidence for dynamic trim data to be more effective than time-history data for neural net training. Low-frequency dynamics are comparable to steady-state operation and are thus covered by trim training data. Higher-frequency dynamics can be effectively covered by either modifying the dynamics of the neural network input signals or by supplementation with flight test time-history data.

The dynamic trim method is advantageous for training neural networks to perform limit prediction in dynamic maneuvers because it captures the instantaneous state space "proximity" to the predicted limit. It is time- and pilot-independent, so dynamic trim neural networks provide a quasi-equilibrium worst case prediction of the limit. The trade-off is that it may not apply for complex dynamic systems, where a dynamic trim equilibrium may not exist. There may be difficulty in defining distinct fast and slow states for the flight regime. And the "worst case" prediction may neglect some higher-order transients and may provide unrealistic lead time. In the described cases, the benefits of time history data did not outweigh the benefits of trim data to train the neural networks, however, it is expected and within the scope of the invention that time history data may be substituted for trim data accordingly.

In fact, because of the limiting considerations of trim data, two neural network systems were trained using time-history data. The Autorotational Main Rotor $\theta_0$, and $N_Z$ neural networks were trained using sets of time-history data. The flight control system includes an autorotation mode task-tailored control law that automatically governs rotor speed $\Omega$ to 104% during unpowered flight. The pilot engages the automatic autorotation mode by dropping the vertical controller position, $\delta_C$, into a movable autorotative detent position. A neural network is used to predict the collective pitch $\theta_0$ setting that will yield 104%$\Omega$ in an autorotation. The neural network autorotational $\theta_0$ prediction positions the movable autorotative $\delta_C$ detent position during powered flight conditions and serves as an initial condition for the algorithm that on-line estimates the autorotational $\theta_0$ setting during unpowered flight. Time history training data for the autorotational $\theta_0$ prediction neural net was generating by flying autorotational approaches and turns at a range of gross weights, density altitudes, and airspeeds, and are illustrated within the ranges of Table 5.

TABLE 5

Flight Control System Autorotational Main Rotor $\theta_0$ Neural Network Training Data Test Plan

| Test Initial Condition | Range |
|---|---|
| GW | 13,000 to 20,000 lb |
| Main Rotor $\mu_X$ | +0.08 to +0.165 |
| $\phi$ | −30 to +30 deg |

Time history data were filtered to eliminate points in time where $\Omega$ was not maintained at 104% or where rotor or aircraft acceleration was significant. Individual time history points were then used as training points to synthesize the neural network. Each time increment was treated as a separate trim data point and then shuffled randomly prior to neural network training. The resulting neural network proved to be a good predictor of the main rotor $\theta_0$ setting required for autorotations.

The Pullup/Pushover maneuver requires the neural network to predict $N_Z$ over 2.0 G and less than 0.5 G. Once again, this requires time-history data. Unlike autorotations, however, pullup/pushovers are highly dynamic maneuvers. For this neural network, piloted simulation data was included for several maneuvers, varying initial airspeed, aircraft gross weight, and altitude. The neural network was synthesized by using the data described in Table 6.

TABLE 6

Flight Control System $N_Z$ Neural Network Training Data Test Plan

| Test Condition | Flight Conditions |
|---|---|
| $\delta_C$ | Hands-Free, Applied |
| Initial U | 60 to 140 kts |
| Pressure Altitude | 3,000 to 12,000 ft |
| GW | 9,000 to 19,000 lb |

Verification/Validation for Flight Applications

Each neural network is fully tested before it is included in the flight control system. Neural network macros may be first tested in a stand-alone "black box" manner over the range of all possible input values to the network. A series of batch integration tests may be then conducted to ensure that the neural net macros function properly on the system level in a number of unpiloted maneuvers and trim conditions designed to exercise the neural networks and the control system functions that they support. Finally, the neural network functions are subjected to a full battery of piloted evaluations using Aeronautical Design Standard (ADS-33) flight maneuvers ("Handling Qualities Requirements for Military Rotorcraft," U.S. Army Aviation and Missile Command, May 2000, ADS-33E-PRF).

Each of these tests is based on a regression test philosophy, wherein each new software revision is subjected to an identical set of tests that are meant to verify the effects of any software modifications. Expected results are generated for each regression test and all changes in regression test results between software versions must be understood and traced to specific software configuration changes before a new version of software is considered to be validated. As a result, the neural networks embodied in this invention must be deterministic in nature so that they produce identical regression test results each time that they are tested.

As indicated above, the method and system of determining tactile cueing of the flight control input apparatus, such as the 3-axis controller and the collective, may be embodied by a computer program product that directs the operation of a flight control computer or the like to issue the commands to the flight control input apparatus to effect soft stops or hard stops, which represent tactile cues that help the pilot of an aircraft avoid exceeding flight envelope limits. In this regard, the computer program product includes a computer-readable storage medium, such as the non-volatile storage medium, and computer-readable program code portions, such as a series of computer instructions, embodied in the computer-readable storage medium. Typically, the computer program is stored by a memory device and executed by an associated processing unit, such as the flight control computer or the like.

In this regard, FIGS. 1, 2, 3, 6 and 7 are block diagram, flowchart and control flow illustrations of methods and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A flight control system for determining tactile cueing of a flight input apparatus, comprising:
    an interface for receiving observed parameters relating to the flight envelope of an aircraft including observed parameters related to an aircraft state;
    at least one upstream processing element for converting dimensional aircraft state parameters into nondimensional aircraft state parameters;
    a plurality of predictive neural networks for receiving combinations of observed parameters and nondimensional aircraft state parameters and predicting flight envelope limiting parameters based thereupon, and
    at least one downstream processing element for determining the most limiting flight envelope limiting parameter, and determining a tactile cueing position for the flight control input apparatus based on the most limiting parameter.

2. A flight control system according to claim 1, wherein the plurality of predictive neural networks further comprises neural networks providing flight envelope limiting parameters that are nondimensional.

3. A flight control system according to claim 1, wherein the plurality of predictive neural networks comprises polynomial neural networks.

4. A flight control system according to claim 1, wherein the plurality of predictive neural networks comprises hyperbolic tangent neural networks.

5. A flight control system according to claim 1, wherein the plurality of predictive neural networks are trained based on a set of trim data.

6. A flight control system according to claim 1, wherein at least one of the upstream processing elements converts dimensional aircraft state parameters into nondimensional aircraft state parameters selected from the group consisting of inflow ratio, advance ratio, thrust coefficient, torque coefficient, rotor hub roll rate, and rotor hub pitch rate.

7. A flight control system according to claim 6, wherein at least one of the upstream processing elements comprises an estimating neural network.

8. A flight control system according to claim 7, wherein the estimating neural network comprises an estimated rotor torque coefficient neural network and an estimated rotor thrust coefficient neural network.

9. A flight control system according to claim 1, wherein at least some of the plurality of predictive neural networks comprise predictive neural networks selected from the group consisting of an inflow ratio prediction neural network, a rotor thrust coefficient prediction neural network, a rotor torque coefficient prediction neural network, and an engine torque prediction neural network.

10. A method of determining tactile cueing for a flight control input apparatus, comprising:
    receiving observed parameters relating to the flight envelope of an aircraft including observed parameters relating to an aircraft state;
    converting at least some observed parameters relating to an aircraft state into nondimensional aircraft state parameters;
    predicting flight envelope limiting parameters based on the observed parameters and nondimensional aircraft state parameters;
    determining the most limiting flight envelope limiting parameter; and
    determining a tactile cueing position for the flight control input apparatus based on the most limiting parameter.

11. The method according to claim 10, wherein the step of receiving observed parameters further comprises receiving aircraft state parameters selected from the group consisting of roll rate, pitch rate, rotor tip mach number, rotor rotational speed, collective pitch, and cyclic pitch.

12. The method according to claim 10, wherein the step of receiving observed parameters further comprises receiving observed parameters relating to engine state parameters selected from the group consisting of turbine gas temperature, engine transmission torque, and gas generator speed.

13. The method according to claim 10, wherein the step of receiving observed parameters further comprises receiving observed parameters relating to environmental parameters selected from the group consisting of ambient temperature and air density.

14. The method according to claim 10, wherein the step of receiving observed parameters further comprises receiving observed parameters relating to aircraft state selected from the group consisting of body-axis forward speed, body-axis sideward speed, and body-axis vertical speed.

15. The method according to claim 10, wherein the step of predicting flight envelope limiting parameters further comprises predicting flight envelope limiting parameters that are nondimensional.

16. The method according to claim 10, wherein the step of converting at least some observed parameters further comprises converting dimensional aircraft state parameters into nondimensional aircraft state parameters selected from the group consisting of inflow ratio, advance ratio, thrust coefficient, torque coefficient, rotor hub roll rate, and rotor hub pitch rate.

17. The method according to claim 10, wherein the step of predicting flight envelope limiting parameters further comprises predicting parameters selected from the group consisting of inflow ratio, rotor thrust coefficient, rotor torque coefficient, and engine torque.

18. A computer program product for determining tactile cueing limits for a flight control input apparatus, the computer program product comprising a computer-readable storage medium and computer-readable code portions stored thereon, the computer-readable codes portions comprising:
    a first executable portion adapted to convert dimensional aircraft state parameters into nondimensional aircraft state parameters;
    a plurality of second executable portions for implementing predictive neural networks for receiving combinations of at least one observed parameter and dimensional aircraft state parameters, and predicting flight envelope limiting parameters based thereupon;
    a third executable portion capable of determining the most limiting flight envelope limiting parameter; and
    a fourth executable portion capable of determining a tactile cueing position for the flight control input apparatus based on the most limiting parameter.

19. The computer program product according to claim 18, wherein at least some of the plurality of second executable portions implement predictive neural networks that predict flight envelope limiting parameters based on aircraft state parameters selected from the group consisting of roll rate, pitch rate, rotor tip mach number, rotor rotational speed, collective pitch, and cyclic pitch.

20. The computer program product according to claim 18, wherein at least some of the plurality of second executable portions implement predictive neural networks that predict flight envelope limiting parameters based on engine state parameters selected from the group consisting of turbine gas temperature and gas generator speed.

21. The computer program product according to claim 18, wherein at least some of the plurality of second executable portions implement predictive neural networks that predict flight envelope limiting parameters based on environmental parameters selected from the group consisting of ambient temperature and air density.

22. The computer program product according to claim 18, wherein at least some of the plurality of second executable portions implement predictive neural networks that predict flight envelope limiting parameters based on body-axis speed selected from the group consisting of forward speed, sideward speed, and vertical speed.

23. The computer program product according to claim 18, wherein at least some of the plurality of second executable portions implement predictive neural networks that provide flight envelope limiting parameters that are nondimensional.

24. The computer program product according to claim 18, wherein at least some of the plurality of second executable portions implement predictive neural networks that comprise polynomial neural networks.

25. The computer program product according to claim 18, wherein at least some of the plurality of second executable portions implement predictive neural networks that comprise hyperbolic tangent neural networks.

26. The computer program product according to claim 18, wherein at least some of the plurality of second executable portions implement predictive neural networks that are trained based on a set of trim data.

27. The computer program product according to claim 18, wherein the first executable portion is further adapted to convert dimensional aircraft state parameters into nondimensional aircraft state parameters selected from the group consisting of inflow ratio, advance ratio, thrust coefficient, torque coefficient, rotor hub roll rate, and rotor hub pitch rate.

28. The computer program product according to claim 27, wherein the first executable portion implements estimating neural networks.

29. The computer program product according to claim 28, wherein the first executable portion implements the estimating neural networks that predict a rotor torque coefficient and a rotor thrust coefficient.

30. The computer program product according to claim 18, wherein at least some of the plurality of second executable portions implement predictive neural networks selected from the group consisting of an induced flow prediction neural network, a rotor thrust coefficient prediction neural network, a rotor torque coefficient prediction neural network, and an engine torque prediction neural network.

* * * * *